United States Patent
Bakx

(10) Patent No.: US 7,054,243 B2
(45) Date of Patent: May 30, 2006

(54) PLAYBACK APPARATUS WITH SECOND VARIATION DETECTION

(75) Inventor: Johannus Leopoldus Bakx, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 190 days.

(21) Appl. No.: 10/496,486

(22) PCT Filed: Nov. 26, 2002

(86) PCT No.: PCT/IB02/04938

§ 371 (c)(1),
(2), (4) Date: May 24, 2004

(87) PCT Pub. No.: WO03/046906

PCT Pub. Date: Jun. 5, 2003

(65) Prior Publication Data

US 2005/0018551 A1 Jan. 27, 2005

(30) Foreign Application Priority Data

Nov. 27, 2001 (EP) .................................. 01204566

(51) Int. Cl.
*G11B 7/00* (2006.01)

(52) U.S. Cl. ............... 369/47.1; 369/47.19; 369/47.21; 369/47.27

(58) Field of Classification Search ............... 369/47.1, 369/47.19, 47.27, 47.21, 44.26, 44.32, 44.28, 369/59.25
See application file for complete search history.

(56) References Cited

U.S. PATENT DOCUMENTS 6,459,664 B1 * 10/2002 Yamada et al. .......... 369/44.32

* cited by examiner

*Primary Examiner*—Nabil Z. Hindi
(74) *Attorney, Agent, or Firm*—Michael E. Belk

(57) ABSTRACT

The invention relates to a playback apparatus for retrieving information from an information carrier (2). The information has been recorded on the information carrier (2) in the form of variations of a first physical parameter. The playback apparatus scans the information carrier by means of a transducer (4), which is responsive to said variations of said physical parameter. An information recovering circuit (5) recovers the information from a first detection signal (D1) received from the transducer (4). The information recovering circuit (5) comprises a phase-locked loop (51). The information carrier (2) exhibits a second variation of a second physical parameter, which differs from said first physical parameter but which is detectable by means of said transducer (4). A detection circuit (6) detects the presence of the second variation on the basis of a second detection signal (D2) received from the transducer (4). The idea of the invention is that the detection circuit (6) is capable of using the phase-locked loop (51) of the information recovering circuit (5) to detect the presence of the second variation. The invention can be implemented very easily in, for example, DVD players to detect the presence of an information carrier (2) with DVD+RW format or an information carrier (2) with DVD–RW format. Only switching means (7) and some minor electronics have to be added; there is no need for an additional phase-locked loop.

10 Claims, 3 Drawing Sheets

PLAYBACK APPARATUS WITH SECOND VARIATION DETECTION

The invention relates to a playback apparatus for reading information from a track of an information carrier that can be accommodated in said playback apparatus, which information carrier exhibits a first variation of a first physical parameter, which first variation corresponds to the information recorded on the information carrier, and which information carrier is capable of exhibiting a second variation of a second physical parameter, which second physical parameter differs from the first physical parameter, which playback apparatus comprises:

scanning means for scanning the information carrier and emitting a first detection signal which exhibits a first signal variation in dependence on the first variation, and emitting a second detection signal which exhibits a second signal variation in dependence on the second variation;

displacement means for bringing about a relative displacement of the track with respect to the scanning means;

decoding means for converting the first detection signal to a decoded signal in dependence upon the first signal variation, which decoding means comprise first phase-locked loop means, and detection means for detecting the second variation of the second physical parameter by means of the second detection signal in a second frequency spectrum situated outside a first frequency spectrum of the first signal variation.

An embodiment of this playback apparatus in accordance with the opening paragraph is known from EP-A-0 930 614.

In the case of this known playback apparatus, the detection means are used to determine whether a second variation is present on the information carrier. Dependent upon the presence or absence of the second variation, the decoder means are, respectively, activated or deactivated. Apparatus that are customarily used to copy information on information carriers copy the first variation which represents the information, without the second variation of the second physical parameter being copied. In the absence of the second variation, the playback apparatus may deactivate the decoding means in the case of a copied information carrier. This makes it difficult to copy information carriers.

The detection means comprise second phase-locked loop means. Phase-locked loop means generally comprise an oscillator for generating an oscillation signal of a certain frequency, which frequency depends on an input signal, phase detection means for detecting a phase difference between the input signal and the oscillation signal, a phase difference signal being generated which is indicative of the phase difference, and filtering means for filtering the phase difference signal and for emitting a filtered signal that serves as the input signal for the oscillator.

The second detection signal is supplied to an input of the second phase-locked loop means. The frequency of the oscillation signal is tuned to the frequency of the second detection signal. If said tuning has been successful, then the second phase-locked loop means are locked. In this case, the detection means emits a signal to indicate that the second variation is present on the information carrier.

An example of the first variation of the first parameter is the variation in reflection of the surface of the information carrier. In this case, the scanning means comprise a laser which causes a beam of light to be incident on the surface. By writing a specific sequence of reflective areas and non-reflective areas on the surface, information can be placed on the information carrier. The sequence of areas form the track mentioned above. Other variations of other physical parameters are possible too.

The second variation of the second physical parameter can also be implemented in different ways. An example of such a variation is a variation in radial distance of the track with respect to the center of rotation in playback apparatus where the displacement means comprise rotation means for rotating the information carrier. The variation may take the form of a wave of a certain frequency. The frequency can also be varied. This variation is referred to as radial track wobble. Another example is a variation in the width of said areas. This variation results in a modulation of the beam that scans the track. If the frequency spectrum of this variation does not overlap the first frequency spectrum of the first variation, then the detection means are capable of determining the presence of this variation.

Examples of such playback apparatus are CD, DVD and DVR playback apparatus.

A drawback of the known playback apparatus is that the detection means require additional components, such as the phase-locked loop means, as a result of which the playback apparatus becomes comparatively expensive.

It is an object of the invention to provide a playback apparatus that requires fewer components for the detection means.

This object is achieved by means of the playback apparatus in accordance with the invention in that the detection means are embodied so as to make use of the first phase-locked loop means of the decoding means to detect the second variation.

If the second variation can be detected in the first detection signal, then the first detection signal can also serve as a second detection signal. In this case, detection of the second variation can be achieved by tuning to the frequency spectrum of the second variation. If the first phase-locked loop means can lock to the frequency of the second variation, then the detection means can emit a signal indicating that the second variation is present. In the absence of this signal, for example, the decoding means can be deactivated, thereby making it difficult to copy an information carrier.

In the case of the playback apparatus, the detection means do not require additional phase-locked loop means because they use the already present first phase-locked loop means of the decoding means. As a result, fewer components are necessary and the playback apparatus can be manufactured more economically.

In an embodiment of the playback apparatus, the second variation comprises a radial undulation in the track.

A radial undulation in the track is a wave-shaped variation of the radial position of the track transverse to the direction of the track, which radial undulation will hereinafter also be referred to as radial wobble. All CD-based and DVD-based writable and rewritable formats have a radial wobble variation in the track mentioned above. For example, for protection against undesirable copying, the detection of the presence of a radial wobble in the track may be useful.

In a further embodiment of the playback apparatus, the playback apparatus further comprises switching means which are embodied so as to switch between a first state and a second state, in which first state the phase-locked loop means are connected to the first detection signal, and in the second state the phase-locked loop means are connected to the second detection signal.

This embodiment is useful if the first detection signal does not comprise the second detection signal. By means of said switching means it is possible to choose whether the first and/or the second detection signal is connected to the phase-locked loop means.

In a more specific form of this embodiment, the second detection signal can be used to make the scanning means follow the track. This gives the advantage that already existing detection signals are used to detect the second variation. In practice various examples are known of the use of detection signals in playback apparatus for following the track by the scanning means. The next two embodiments of the playback apparatus in accordance with the invention make use of such detection signals.

In an embodiment, the second detection signal comprises a radial push-pull signal to follow the track. An example of a radial push-pull signal is the 3-beam push-pull signal. In the case of said 3-beam push-pull signal, the scanning means generate three light beams: a main beam for generating the first detection signal, and two satellite beams between which the desired track is clamped. One satellite beam is displaced, both radially and tangentially, in a positive direction relative to the main beam, and the other satellite beam is displaced, both radially and tangentially, in a negative direction with respect to the main beam. The displacement in the radial direction amounts to one quarter of the distance between the tracks. By using a separate diode for converting each reflected satellite spot, a radial tracking signal can be generated. In this case, the signals originating from the diodes are subtracted from each other. The above-mentioned radial wobble can be readily detected by means of the push-pull signal. Push-pull signals are frequently used in playback apparatus such as CD players. Making these apparatus suitable for detection of the second variation is comparatively simple. In addition to the simple implementation of the detection means it is sufficient to add switching means.

In an embodiment, the second detection signal comprises a differential-phase detection signal for following the track. The differential-phase detection signal will hereinafter also be referred to as DPD signal. Track following by means of the DPD signal is frequently performed in playback apparatus such as DVD players. In this case, the scanning means generate a light beam which, after reflection, is received by a diode having four detection faces, after which each detection face emits a signal in dependence upon the amount of light incident on the faces. To generate the DPD signal, the following steps are taken:

signals originating from the detection faces, which are diagonally opposite each other, are added together, which results in two sum signals, the phase difference between the sum signals is determined, the DPD signal is a measure of this phase difference.

Playback apparatus with a DPD tracking signal can also be readily adapted for the detection of the second variation. Also in this case, adding switching means, in addition to the simple implementation of the detection means, is sufficient.

In a further embodiment of the playback apparatus comprising switching means, the detection means are capable of detecting the radial wobble by carrying out the following steps:

a. making the switching means switch to the second state;
b. making the displacement means displace the track with respect to the scanning means, thereby causing the frequency of the second signal variation to fall within a bandwidth to which the first phase-locked loop means can tune;
c. making the first phase-locked loop means tune to the second signal variation;
d. emitting a second variation detection signal when the frequency to which the first phase-locked loop means are tuned corresponds to the speed of rotation.

Phase-locked loop means frequently have a certain frequency band within which locking to input signals is possible. For this reason, the relative speed between the scanning means and the track is brought to a level at which the frequency of the second signal variation falls within this frequency band. In practice, the displacement means comprise rotation means by means of which the information carrier is rotated. Subsequently, the phase-locked loop means can tune to the second signal variation. If this is possible, then the conclusion can be drawn that the second variation is present on the information carrier.

In another embodiment of the playback apparatus, said playback apparatus further comprises determination means for determining a property of the information carrier by means of the second variation. For example, the difference between a writable CD and a ROM-CD can be determined by finding out whether or not the CD has a radial wobble. Writable CDs do have a radial wobble, ROM-CDs don't.

In the case of a more specific implementation of this embodiment, the playback apparatus is a DVD player, and the determination means are capable of making a distinction between an information carrier with a DVD−RW format and an information carrier with a DVD+RW format. The distinction between an information carrier with a DVD−RW format and an information carrier with a DVD+RW format can be made as a result of the fact that the frequency of the radial wobble of both information carriers is different. By finding out which frequency the first phase-locked loop means are tuned to, it is possible to discover the format of the information carrier.

The detection means of a further embodiment additionally comprise means for decoding additional information which may be comprised in the second variation. For example, in the case of the radial wobble variation, the wobble can be modulated, such as frequency modulation. Additional information may be comprised in this modulation. Said additional information may comprise, for example, a code. This code may be compared to a previously known code. If these codes correspond, it may be decided to continue reading, or, if they do not correspond, it may be decided to stop reading. In this case, the detection means do need a demodulator to demodulate the radial wobble and comparison means to compare the demodulated code to the previously known code.

These and other aspects of the playback apparatus in accordance with the invention are apparent from and will be elucidated with reference to the embodiments described hereinafter.

Figure 1:
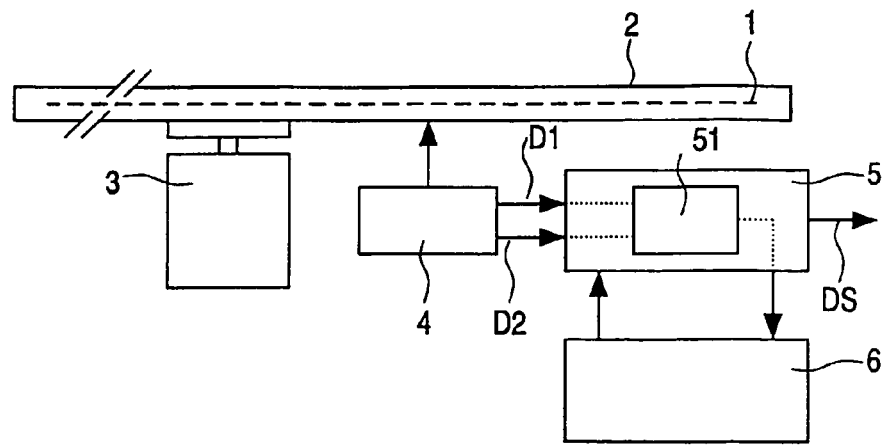
FIG. 1 shows an embodiment of the playback apparatus accommodating an information carrier.

In FIG. 1, the information carrier 2 is accommodated in an embodiment of the playback apparatus in accordance with the invention. Displacement means 3 are present which are capable of displacing the track 1 with respect to the scanning means 4. In practice, the displacement means 3 often comprise rotation means that cause rotation of the information carrier 2. The scanning means 4 scan the track 1 on the information carrier 2. In this process, a first detection signal D1 and a second detection signal D2 are generated. D1 is transmitted to the decoding means 5. The decoding means 5 comprise phase-locked loop means 51. The detection means 6 are capable of using the phase-locked loop means 51 of the decoding means 5 to detect the second variation.

Figure 2A:
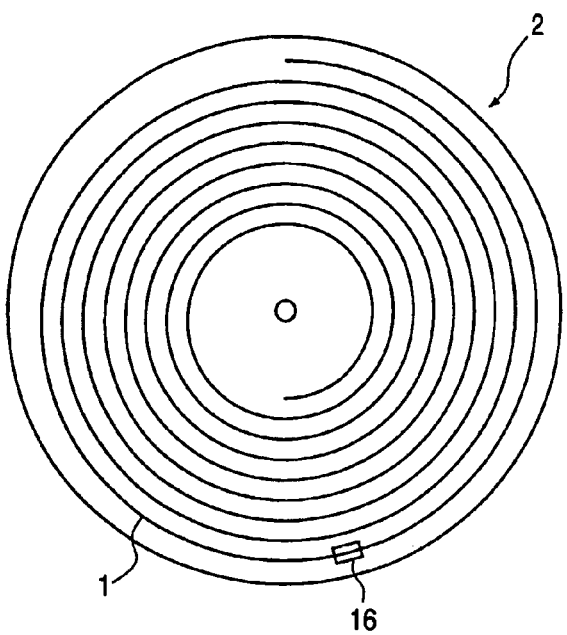
FIG. 2a is a plan view of an information carrier.
Figure 2B:
FIG. 2b shows a part of a track with radial wobble variation.
Figure 2C:
FIG. 2c shows a part of a track having a variation in width.
Figure 2D:
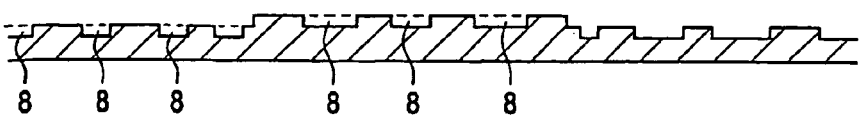
FIG. 2d shows a part of a track having a variation in height.

FIG. 2a is a plan view of the information carrier 2 and the track 1. The second variation can be implemented in various ways. FIG. 2b is a magnified view of a part of the track, hereinafter referred to as sub-track 16, wherein the second variation comprises a radial wobble. The areas 8 shown are so-termed "pits" 8. Pits 8 may constitute, for example, a difference in height in the surface of the information carrier 2. A sequence of pits 8 form the track 1, the pits 8 being the first variation wherein the information is contained. In FIG. 2c, the second variation comprises the width of the pits 8. Finally, FIG. 2d shows the variation in height of the pits 8. In this case, the information carrier 2 is shown in cross-section.

The first detection signal D1 and the second detection signal D2 are supplied to the phase-locked loop means 51. The phase-locked loop means 51 can be implemented such that they are capable of operating in two modes, i.e., a first mode wherein locking to the first detection signal D1 takes place, thereby causing the decoded signal DS to be generated, and a second mode wherein locking to the second detection signal D2 takes place.

Figure 3:
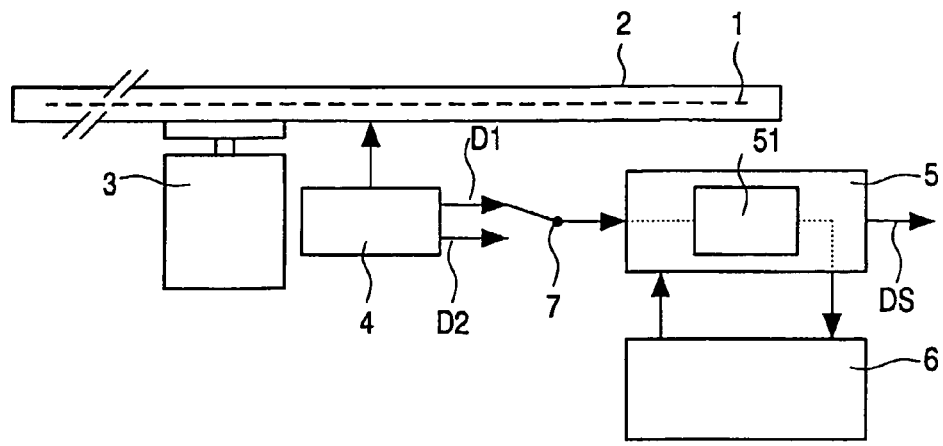
FIG. 3 shows an embodiment of the playback apparatus comprising switching means.

In the embodiment of the playback apparatus shown in FIG. 3, the switching means 7 are used for switching between the first mode and the second mode. This embodiment can be implemented very readily because the decoding means only have to undergo minor changes and, apart from that, only switching means are necessary. The decoding means are often integrated in IC form, so that adapting these means would be difficult.

Figure 4:
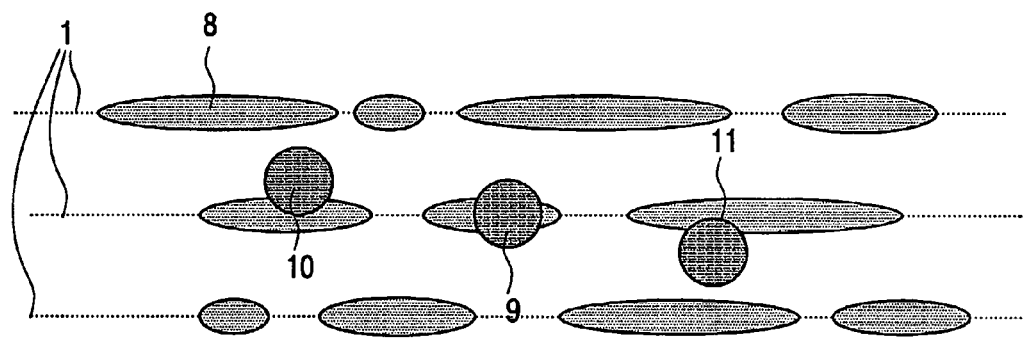
FIG. 4 shows the three beams on the track in the case of 3-beam push-pull tracking.

As shown in FIG. 4, in the case of 3-beam push-pull tracking, three light beams 9, 10 and 11 are generated by the scanning means 4, i.e., a main beam 9, a first satellite beam 10 and a second satellite beam 11. The first satellite beam 10 is projected at a certain distance from the main beam 9 in the tangential direction and the radial direction. The second satellite beam 11 is projected at the same distance yet in the opposite tangential and radial directions. The reflections of the satellite beams 10, 11 are received by diodes and converted to two satellite signals. The second detection signal D2, which can be used as a tracking signal, is generated by subtracting the satellite signals from each other. The second variation resulting from a radial wobble can be detected comparatively readily in the resulting push-pull signal.

Figure 5:
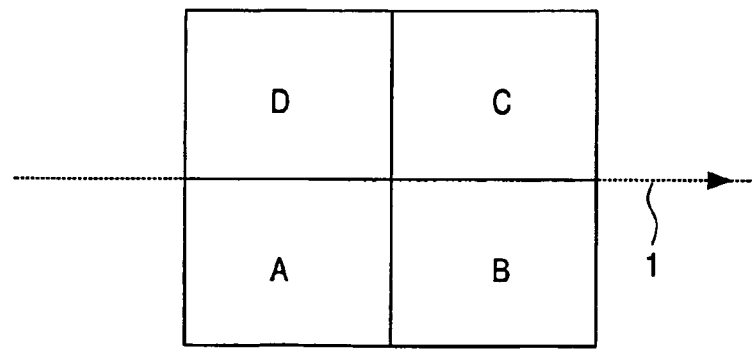
FIG. 5 shows an example of a photodiode for converting the reflected main beam into the first and the second detection signal.
Figure 6A:
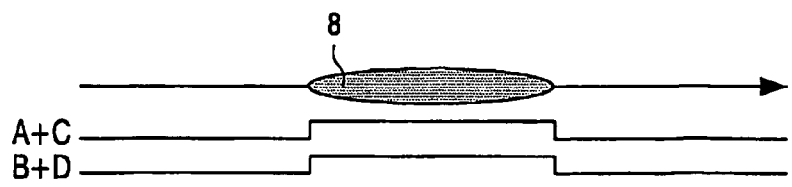
FIG. 6a shows an example of track following by means of a light beam, said light beam following the track radially in the center of the latter.
Figure 6B:
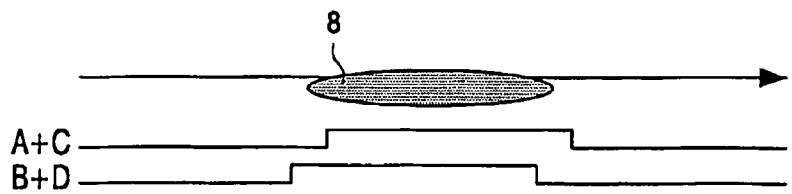
FIG. 6b shows an example of track following by means of a light beam, said light beam following the track radially along the center of the latter.
Figure 6C:
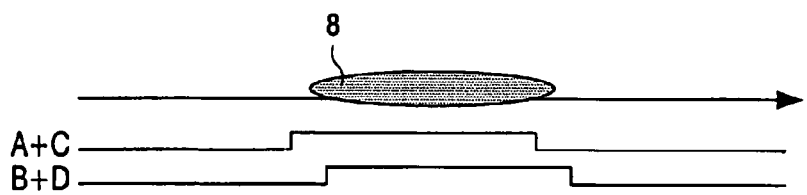
FIG. 6c shows an example of track following by means of a light beam, said light beam following the track radially along the center of the latter, and, with respect to FIG. 6b, on the other side of the track.

In the case of DPD tracking, only one light beam is generated. After reflection, the beam is incident on a photodiode which is divided into four faces A, B, C, D, see FIG. 5. The arrow shown in FIG. 5 indicates the direction of the photodiode across the track 1. To generate the DPD signal, the signals originating from phase A and phase C are added, and the signals originating from phase B and phase D are added. The DPD signal is a measure of the phase difference between the two resulting sum signals. In FIG. 6a, the arrow indicates how the light beam moves across the pits 8. In FIG. 6a, the light beam is incident in the middle of the pits, which is an indication of good tracking. The sum signals A+C and B+D do not indicate a phase difference. In this case, the DPD signal is small. In FIG. 6b, the light beam is not incident in the middle of the pits 8. As a result, a phase difference develops between the sum signals, as is shown in FIG. 6b. Also in FIG. 6c, the light beam is not incident in the middle of the pits 8, but, with respect to FIG. 6b, it is incident on another side of the pits 8. Also in the DPD signal, a wobble variation brings about the second signal variation in the DPD signal.

Figure 7:
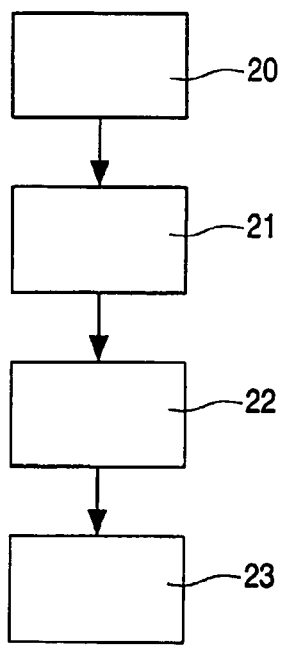
FIG. 7 shows the steps which the detection means can carry out to detect the wobble.

The presence of a radial wobble can be detected by carrying out the steps shown in FIG. 7. In step 20, the switching means 7 are switched to the second state. Next, in step 21, the information carrier 2 is brought to a speed of rotation at which the frequency of the second variation is within a range wherein the phase-locked loop means 51 are capable of tuning to this frequency. This range of the phase-locked loop means 51 can also be adapted to the frequency of the second variation. In step 22, the phase-locked loop means 51 tune to this frequency. If the frequency corresponds to the speed of rotation of the information carrier 2, then a signal is emitted, in step 23, to indicate that the radial wobble has been detected. The frequency of the radial wobble may be a multiple of the rotation frequency.

Figure 8:
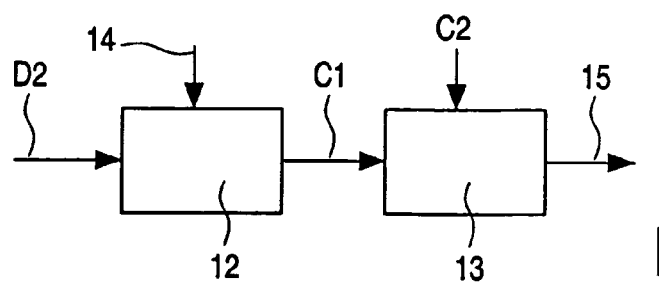
FIG. 8 shows an example of additional means for decoding additional information.

The detection means 6 may be equipped with additional means for decoding additional information that may be comprised in the second variation. In FIG. 8 an example is shown of such additional means. In this example, the additional information in the second variation is comprised by modulation of the second variation. The second detection signal D2 is supplied, in FIG. 8, to demodulation means 12. For demodulation, the demodulation means 12 make use of the oscillation signal 14 originating from the phase-locked loop means 51. The additional information may comprise a code C1. By means of the comparison means 13, the demodulated code C1 is compared to a previously known code C2. If these codes correspond, a code signal 15 is generated by the comparison means 13 to indicate that the codes correspond. The code signal 15 can be used to allow reading of the playback apparatus to continue or, conversely, to block reading. In this manner, protection against unwanted copying can be attained.

The invention claimed is:

1. A playback apparatus for reading information from a track (1) of an information carrier (2) that can be accommodated in said playback apparatus, which information carrier (2) exhibits a first variation of a first physical parameter, which first variation corresponds to the information recorded on the information carrier (2), and which information carrier (2) is capable of exhibiting a second variation of a second physical parameter, which second physical parameter differs from the first physical parameter, which playback apparatus comprises:

scanning means (4) for scanning the information carrier (2) and emitting a first detection signal (D1) which exhibits a first signal variation in dependence on the first variation, and emitting a second detection signal (D2) which exhibits a second signal variation in dependence upon the second variation;

displacement means (3) for bringing about a relative displacement of the track (1) with respect to the scanning means (4);

decoding means (5) for converting the first detection signal (D1) to a decoded signal (DS) in dependence upon the first signal variation, which decoding means comprise first phase-locked loop means (51), and detection means (6) for detecting the second variation of the second physical parameter by means of the second detection signal (D2) in a second frequency spectrum situated outside a first frequency spectrum of the first signal variation, characterized in that the detection means (6) are embodied so as to make use of the first phase-locked loop means (51) of the decoding means (5) to detect the second variation.

2. A playback apparatus as claimed in claim 1, characterized in that the second variation comprises a radial undulation of the track (1).

3. A playback apparatus as claimed in claim 1, characterized in that the playback apparatus further comprises switching means (7) which are embodied so as to switch between a first state and a second state, in which first state the phase-locked loop means (51) are connected to the first detection signal (D1), and in the second state the phase-locked loop means (51) are connected to the second detection signal (D2).

4. A playback apparatus as claimed in claim 3, characterized in that the second detection signal (D2) can be used to make the scanning means (4) follow the track (1).

5. A playback apparatus as claimed in claim 4, characterized in that the second detection signal (D2) comprises a radial push-pull signal.

6. A playback apparatus as claimed in claim 4, characterized in that the second detection signal (D2) comprises a differential phase detection signal.

7. A playback apparatus as claimed in claim 3, characterized in that the detection means (6) are capable of detecting the radial wobble by carrying out the following steps:

a. making the switching means (7) switch to the second state;

b. making the displacement means (3) displace the track (1) with respect to the scanning means (4), thereby causing the frequency of the second signal variation to fall within a bandwidth to which the first phase-locked loop means (51) can tune;

c. making the first phase-locked loop means (51) tune to the second signal variation;

d. emitting a second variation detection signal when the frequency to which the first phase-locked loop means (51) are tuned corresponds to the speed of rotation.

8. A playback apparatus as claimed in claim 1, characterized in that said playback apparatus further comprises determination means for determining a property of the information carrier (2) by means of the second variation.

9. A playback apparatus as claimed in claim 8, characterized in that the playback apparatus is a DVD player, and the determination means are capable of making a distinction between an information carrier (2) with a DVD−RW format and an information carrier (2) with a DVD+RW format.

10. A playback apparatus as claimed in claim 1, characterized in that the detection means (6) further comprise means for decoding additional information which may be comprised in the second variation.

* * * * *